US012640085B2

(12) United States Patent
Su et al.

(10) Patent No.: US 12,640,085 B2
(45) Date of Patent: May 26, 2026

(54) DISPLAY PROCESSING CIRCUIT AND COMPENSATION METHOD

(71) Applicant: Novatek Microelectronics Corp., Hsinchu (TW)

(72) Inventors: Shang-Yu Su, Hsinchu County (TW); Feng-Ting Pai, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/789,657

(22) Filed: Jul. 30, 2024

(65) Prior Publication Data

US 2026/0038420 A1 Feb. 5, 2026

(51) Int. Cl.
*G09G 3/32* (2016.01)

(52) U.S. Cl.
CPC ....... *G09G 3/32* (2013.01); *G09G 2320/0233* (2013.01); *G09G 2320/0626* (2013.01)

(58) Field of Classification Search
CPC ... G09G 2320/0626; G09G 2320/0233; G09G 3/32
See application file for complete search history.

(56) References Cited

U.S. PATENT DOCUMENTS

| | | | | |
|---|---|---|---|---|
| 10,170,035 | B2 * | 1/2019 | Park | G09G 3/3208 |
| 11,024,229 | B2 | 6/2021 | Zhang | |
| 2016/0086537 | A1 * | 3/2016 | Shin | G09G 3/3225 345/207 |
| 2020/0135112 | A1 | 4/2020 | Zhang | |
| 2021/0312849 | A1 * | 10/2021 | Park | G09G 3/20 |
| 2024/0054968 | A1 | 2/2024 | Wen et al. | |
| 2024/0274061 | A1 * | 8/2024 | Ge | G09G 3/30 |

FOREIGN PATENT DOCUMENTS

CN 109192141 1/2021

OTHER PUBLICATIONS

"Office Action of Taiwan Counterpart Application", issued on Mar. 26, 2026, p. 1-p. 5.

* cited by examiner

*Primary Examiner* — Muhammad N Edun
(74) *Attorney, Agent, or Firm* — JCIPRNET

(57) ABSTRACT

Display processing circuits and compensation methods are provided. The display processing circuit is adapted to compensate an electroluminescence (EL) display device. The display compensation circuit comprises a detecting circuit and a compensation circuit. The detecting circuit is configured to determine a degree of change of a display data within a first time length. The compensation circuit is configured to increase a compensation brightness level applied to the display data when the degree of change is less than a predetermined degree.

41 Claims, 9 Drawing Sheets

DISPLAY PROCESSING CIRCUIT AND COMPENSATION METHOD

BACKGROUND

1. Technical Field

The disclosure generally relates to a circuit and method, and more particularly, to a display processing circuit and compensation method.

2. Description of Related Art

In modern technologies, an electroluminescence (EL) display device is serving an important role in display. Therefore, it is critical to improve all sorts of brightness degradation to elevate user experience.

SUMMARY

Accordingly, the disclosure is directed to a display processing circuit and compensation method capable of compensating brightness degradation of an EL display device.

The display processing circuit of the present disclosure is adapted to compensate an electroluminescence (EL) display device. The display compensation circuit comprises a detecting circuit and a compensation circuit. The detecting circuit is configured to determine a degree of change of a display data within a first time length. The compensation circuit is configured to increase a compensation brightness level applied to the display data when the degree of change is less than a predetermined degree.

The compensation method of the present disclosure is for compensating an electroluminescence (EL) display device. The compensation method comprises: determining a degree of change of a display data within a first time length; and increasing a compensation brightness level applied to the display data when the degree of change is less than a predetermined degree.

The display processing circuit of the present disclosure is adapted to compensate an electroluminescence (EL) display device. The display compensation circuit comprises a detecting circuit and a compensation circuit. The detecting circuit is configured to compare an average brightness level corresponding to a display data with a brightness threshold to generate a detect signal accordingly. The compensation circuit is configured to adjust a compensation brightness level applied to the display data when the average brightness level is greater than the brightness threshold.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
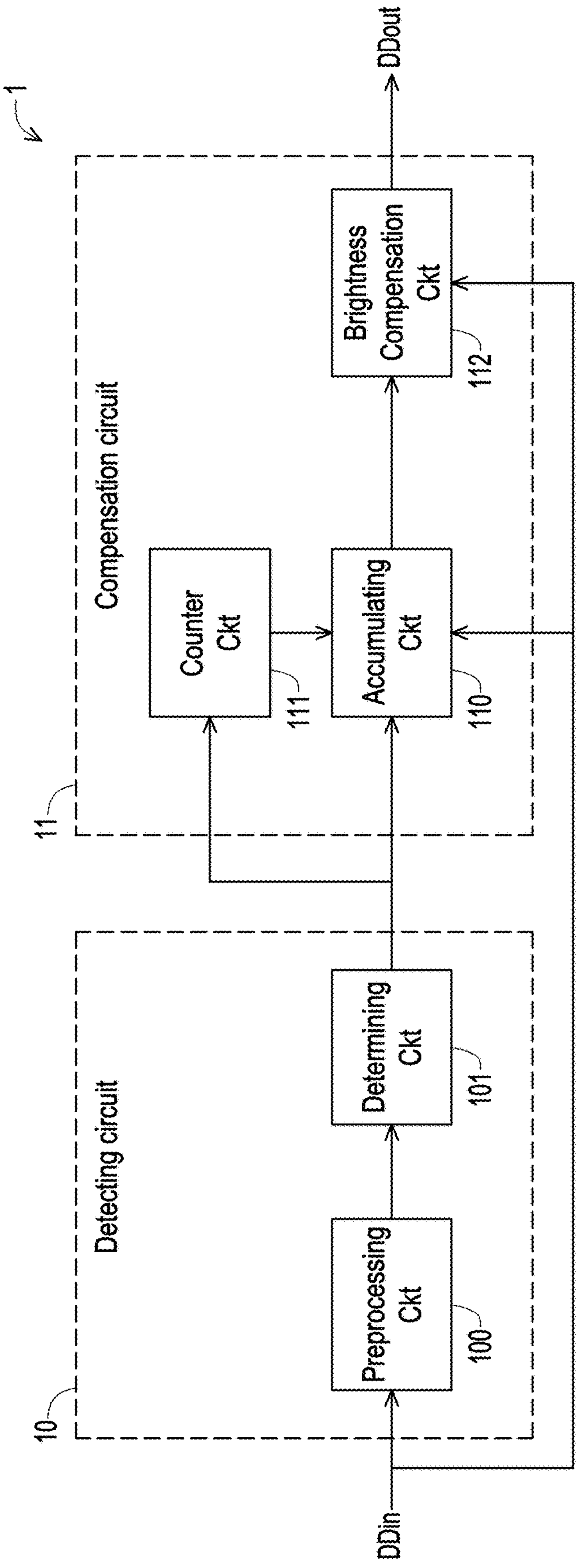
FIG. 1 illustrates a display processing circuit in accordance with some embodiments of the present disclosure.

FIG. 1 illustrates a display processing circuit 1 in accordance with some embodiments of the present disclosure. The display processing circuit 1 may be utilized in an electroluminescence (EL) display device to compensate its display quality. Specifically, the display processing circuit 1 may be coupled to a display panel. The display processing circuit 1 may be configured to receive an input display data DDin and compensate the input display data DDin by a compensation brightness level when needed.

In some embodiments, the EL display device may be a light-emitting diode (LED) based display device. The EL display device may include LEDs, OLEDs, micro-LEDs, or the like in its display panel for display. In certain display scenarios, the EL display device may suffer from a temporary brightness degradation when one or more degradation condition is met, but the EL display device may quickly recover to its desired brightness level for display once the degradation criterion no longer exist. In this way, the display processing circuit 1 applied to the EL display device may be configured to tune up the brightness level of the input display data when the degradation condition occurs. Since the brightness degradation is temporary, unlike burn—in, the display processing circuit 1 may be configured to cancel compensation applied to the brightness level once the degradation condition is gone.

The display processing circuit 1 includes a detecting circuit 10 and a compensation circuit 11. The detecting circuit 10 may be configured to receive the input display data DDin to determine a degree of change of the input display data DDin within a first time length. The compensation circuit 11 may be configured to increase a compensation brightness level applied to the input display data DDin when the degree of change is less than a predetermined degree, to generate the output display data DDout.

The detecting circuit 10 includes a preprocessing circuit 100 and a determining circuit 101. The preprocessing circuit 100 may be configured to perform a preliminary process on the received input display data DDin to generate one or more display data parameters. The determining circuit 101 may be configured to determine the degree of change and a determination on whether the degree of change exceeds the predetermined degree based on the display data parameters, and, generate a detect signal DS for indicating the degree of change.

Besides, the compensation circuit 11 includes an accumulating circuit 110, a counter circuit 111, and a brightness compensation circuit 112. The counter circuit 111 may be configured to generate a counter signal at a first frequency or at a second frequency, according to the degree of change. The accumulating circuit 110 is coupled to the determining circuit 101 and the counter circuit 111, and is configured to record a compensation brightness level according to the degree of change. The brightness compensation circuit 112 is coupled to the accumulating circuit 110, and configured to add a brightness level corresponding to the input display data DDin with the compensation brightness level to generate the output display data DDout.

In some embodiments, the display processing circuit 1 may include, but not limited to, a central processing unit, a microprocessor, an application specific integrated circuit, a timing controller, a graphics processing unit, a field programmable gate array, an advanced RISC machine or combinations thereof. In addition, the program controller 106 may also be implemented through synthesis using hardware description language (HDL), such as high-speed hardware description language (VHDL), Verilog or the like. In some embodiments, the processing circuit 1 may be realized by a full custom circuit, or designed by hardware description language (HDL), such as Verilog or VHDL, etc. and realized through synthesis.

Figure 2A:
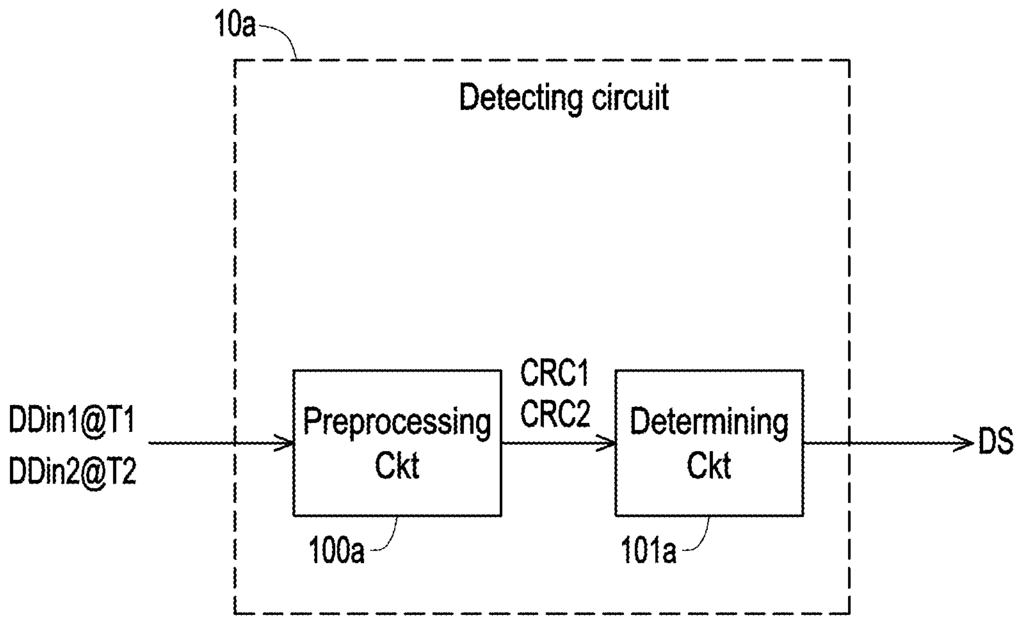
FIG. 2A illustrates a detecting circuit in accordance with some embodiments of the present disclosure.

FIG. 2A illustrates a detecting circuit 10*a* in accordance with some embodiments of the present disclosure. The detecting circuit 10*a* in FIG. 2A is similar to the detecting circuit 10 in FIG. 1, so the detecting circuit 10*a* may be used in the display processing circuit 1 to replace the detecting circuit 1.

In this embodiment, the detecting circuit 10*a* is configured to receive and compare a first input display data DDin1 and a second input display data DDin2 respectively received at a first time point T1 and a second time point T2. The first time point T1 and the second time point T2 are separated by the first time length. In other words, the detecting circuit 10*a* may be configured to monitor the input display data constantly, and the input display data is inputted to the detecting circuit 10*a* periodically by a time interval of the first time length. The detecting circuit 10*a* is configured to determine the degree of change by comparing the first input display data DDin1 and the second input display data DDin2. More particularly, the detecting circuit 10*a* is configured to determine that the degree of change between the first input display data DDin1 and the second input display data DDin2 is less than the predetermined degree when the first input display data DDin1 and the second input display data DDin2 are the same. The detecting circuit 10*a* is configured to determine that the degree of change between the first input display data DDin1 and the second input display data DDin2 is greater than or equal to the predetermined degree when the first input display data DDin1 and the second input display data DDin2 are not the same.

Specifically, the preprocessing circuit 100*a* is configured to extract a first and second characteristic values respectively from the first and second input display data DDin1, DDin2. The determining circuit 101*a* is configured to compare the first and second characteristic values to generate the degree of change. In some embodiments, the preprocessing circuit 100*a* may be a cyclic redundancy check (CRC) circuit, and may be configured to perform a CRC operation on the first and second input display data DDin1, DDin2 to respectively generate the corresponding first and second CRC values CRC1, CRC2 as the first and second characteristic values. The CRC operation may be configured to generate a unique CRC value based on contents of an input display data, so that when the carried contents carried by the input display data changes, the generated CRC value changes accordingly. In this way, the determining circuit 101*a* may be configured to determine whether the first and second input display data DDin1, DDin2 are the same by comparing the first and second CRC values CRC1, CRC2, and generate the detect signal DS indicating the degree of change between the first and second input display data DDin1, DDin2 accordingly.

Figure 2B:
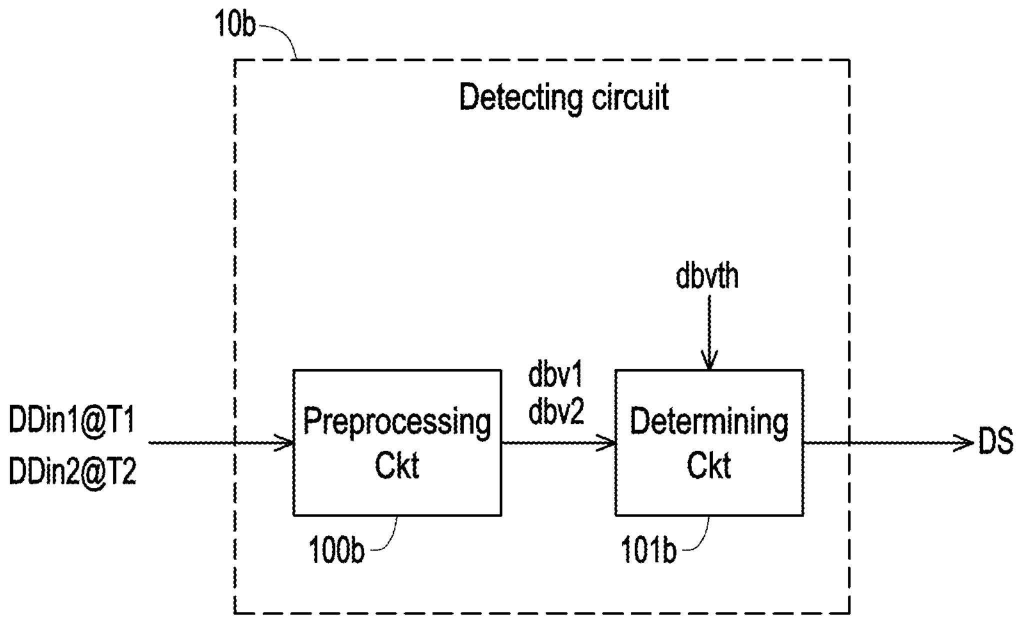
FIG. 2B illustrates a detecting circuit in accordance with some embodiments of the present disclosure.

FIG. 2B illustrates a detecting circuit 10*b* in accordance with some embodiments of the present disclosure. The detecting circuit 10*b* in FIG. 2B is similar to the detecting circuit 10 in FIG. 1, so the detecting circuit 10*b* may be used in the display processing circuit 1 to replace the detecting circuit 1.

In this embodiment, the detecting circuit 10*b* is configured to receive and to compare the first input display data DDin1 and the second input display data DDin2 separated by the first time length. The detecting circuit 10*b* is configured to determine the degree of change between the first input display data DDin1 and the second input display data DDin2 by comparing a first brightness setting value and a second brightness setting value respectively corresponding to the first input display data DDin1 and the second input display data DDin2 to generate the degree of change. Specifically, the first and second brightness setting values respectively extracted from the first and second input display data DDin1, DDin2 by the detecting circuit 10*b* may be two display brightness values (dbv). In some embodiments, the dbv parameter may correspond to a brightness setting value shown by the EL display device, and may also be referred as a backlight brightness in certain application. The dbv parameter may be set as a value between 0 to 99 or 0 to 4095, and each dbv parameter may correspond to a corresponding display gamma curve.

The preprocessing circuit 100*b* may be configured to extract a first and second dbvs dbv1, dbv2 respectively from the first and second input display data DDin1, DDin2. The determining circuit 101*b* may be configured to receive and compare the first and second dbvs dbv1, dbv2 to generate the degree of change. In this way, the detecting circuit 10*b* may be configured to determine that the degree of change between the first input display data DDin1 and the second input display data DDin2 is less than the predetermined degree when the first and second dbvs are the same or when the difference is within a predetermined dbv range. Further, the detecting circuit 10*b* may be configured to determine that the degree of change between the first input display data DDin1 and the second input display data DDin2 is greater than or equal to the predetermined degree when the first and second dbvs dbv1, dbv2 are different, or when the difference is out of the predetermined dbv range.

In some embodiments, the determining circuit 101*b* may be configured to further receive a dbv threshold dbvth, so that the determining circuit 101*b* may compare the first and second dbvs dbv1, dbv2 with the dbv threshold dbvth. The determining circuit 101*b* may be configured to generate the detect signal DS indicating that the degree of change between the first and second input display data DDin1, DDin2 is greater than or equal to the predetermined degree only when the first and second dbvs dbv1, dbv2 are greater than or equal to the dbv threshold dbvth.

Figure 2C:
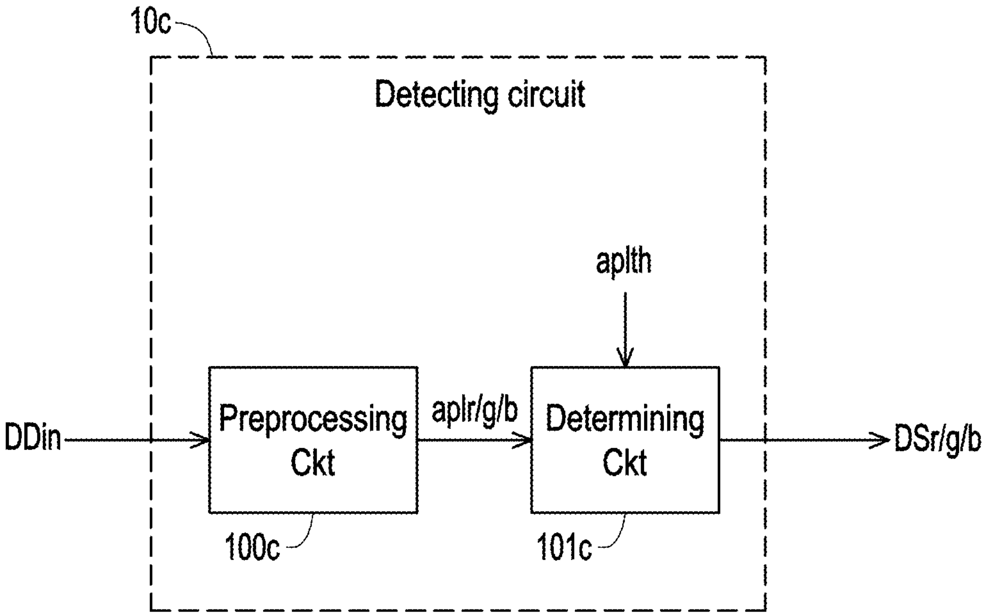
FIG. 2C illustrates a detecting circuit in accordance with some embodiments of the present disclosure.

FIG. 2C illustrates a detecting circuit 10*c* in accordance with some embodiments of the present disclosure. The detecting circuit 10*a* in FIG. 2C is similar to the detecting circuit 10 in FIG. 1, so the detecting circuit 10*c* may be used in the display processing circuit 1 to replace the detecting circuit 1.

In some embodiments, the detecting circuit 10*c* may be configured to compare an average brightness level corresponding to the input display data DDin with a brightness threshold aplth to generate the detect signal DS to the compensation circuit 11 accordingly.

In some embodiments, the input display data DDin carries display information of different colors (such as red, green, blue, or cyan, yellow, magenta) for each pixels on the display panel to display. The preprocessing circuit 100*c* may be configured to calculate an average brightness level of each color of the input display data DDin, so that the determining circuit 101*c* may generate the degree of change for each display color of the input display data DDin. Specifically, the preprocessing circuit 100*c* may be configured to calculate a first to third average brightness levels aplr, aplg, aplb by respectively averaging brightness levels of a first to third colors of all pixels corresponding to the input display data DDin. For example, the preprocessing circuit 100*c* may be configured to average brightness levels of the red, green, blue colors of all pixels to respectively generate the first to third average brightness levels aplr, aplg, aplb according to the input display data DDin. The determining circuit 101*c* may be configured to compare the first to third average brightness levels aplr, aplg, aplb with the brightness threshold aplth to generate a first to third detect signals DSr/DSg/DSb.

In some embodiments, the brightness threshold aplth may include more than one threshold values. For example, the brightness threshold aplth may include brightness thresholds aplthr, aplthg, aplthb respectively corresponding to the colors of red, green, blue. The determining circuit 101*c* may generate each of the detect signals DSr, DSg, DSb of based on respective comparison result of each color.

In some embodiments, a detecting circuit 10 applied in the display processing circuit 1 may be adaptively designed to implement anyone or more functions of the detecting circuits 10*a*-10*c* in FIGS. 2A-2C to generate the corresponding detect signal DS. For example, the detecting circuit 10 may be configured to compare the first and second CRC values CRC1, CRC2, and the first and second dbv parameters dbv1, dbv2 of the first and second input display data DDin1. DDin2 to generate the degree of change between the first and second input display data DDin1, DDin2. In some embodiments, the determining circuit 101 may be configured to set the detect signal DS at the value 0 when both the comparison result between the first and second CRC values CRC1, CRC2, and the comparison result between the first and second dbv parameters dbv1, dbv2 show that the degree of change between the first and second input display data DDin1, DDin2 is out of the predetermined degree. Otherwise, when anyone of the comparison result shows that degree of change between the first and second input display data DDin1, DDin2 is within the predetermined degree, the determining circuit 101 may set the detect signal at the value 1 accordingly.

Figure 2D:
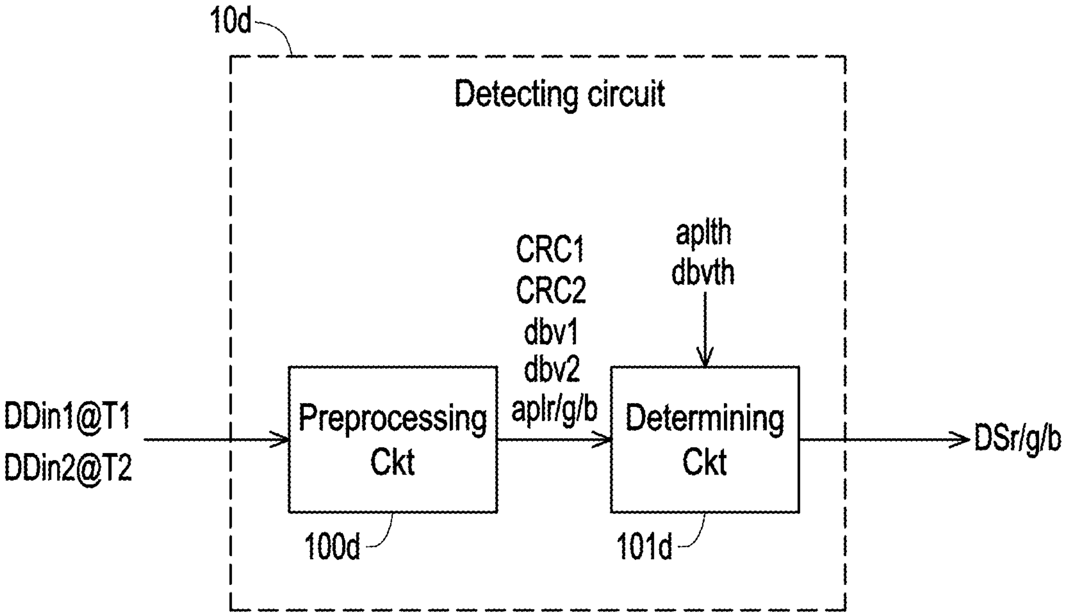
FIG. 2D illustrates a detecting circuit in accordance with some embodiments of the present disclosure.

FIG. 2D illustrates a detecting circuit 10*d* in accordance with some embodiments of the present disclosure. The detecting circuit 10*d* in FIG. 2D is may be a combination result of the detecting circuits 10*a*-10*c* in FIGS. 2A-2C.

In this embodiment, the detecting circuit 10*d* may be configured to sense whether the first and second input display data DDin1, DDin2 are the same, or the dbv parameters dbv1, dbv2 corresponding to the first and second input display data DDin1, DDin2 are the same, or the average brightness level corresponding to the input display data DDin2 is greater than the brightness threshold aplth. Specifically, the detecting circuit 10*d* may be configured to set the detect signals DSr, DSg, DSb together as the value 1 if the degradation conditions are met, and set the detect signals DSr, DSg, DSb together as the value 0 if the degradation conditions are not detected. In addition, the detecting circuit 10*d* may be configured to set the detect signals DSr, DSg, DSb respectively corresponding to the average brightness level of each color of the second input display data DDin2.

In this way, the detecting circuit 10*d* may be configured to adaptively provide the detect signals DSr, DSg, DSb according to whether the degradation conditions are met, or according to the average brightness level corresponding to the input display data DDin1/DDin2.

Figure 3A:
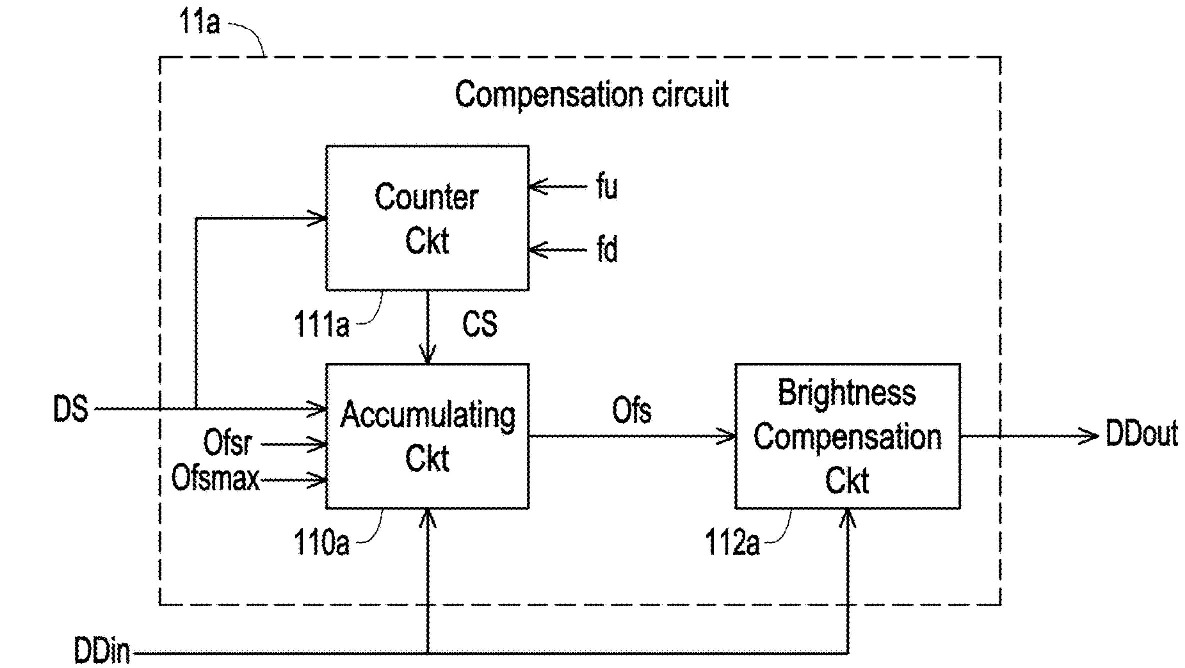
FIG. 3A illustrates a compensation circuit in accordance with some embodiments of the present disclosure.

FIG. 3A illustrates a compensation circuit 11*a* in accordance with some embodiments of the present disclosure. The compensation circuit 11*a* in FIG. 3A is similar to the compensation circuit 11 in FIG. 1, so the compensation circuit 11*a* may be used in the display processing circuit 1 to replace the compensation circuit 11.

In some embodiments, the compensation circuit 11*a* is configured to increase the compensation brightness level Ofs applied to the input display data DDin when the degree of change is less than the predetermined degree, and configured to decrease the compensation brightness level Ofs applied to the input display data DDin when the degree of change is greater than or equal to the predetermined degree. More specifically, since the brightness degradation is temporary, the compensation circuit 11*a* may decrease the compensation brightness level Ofs when the degradation condition is not met using the evaluation of degree of change on the input display data DDin.

In some embodiments, the compensation circuit 11*a* includes an accumulating circuit 110*a*, a counter circuit 111*a*, and a brightness compensation circuit 112*a*.

The counter circuit 111*a* is coupled to the detecting circuit 10 and the accumulating circuit 110*a*. The counter circuit 111*a* is configured to provide a counter signal CS to the accumulating circuit 110*a* according to the degree of change. The accumulating circuit 111*a* is configured to adjust the compensation brightness level Ofs according to a frequency of the counter signal.

The accumulating circuit 110*a* is coupled to the detecting circuit 10 and configured to adjust the compensation brightness level Ofs. Specifically, the accumulating circuit 110*a* is configured to increase the compensation brightness level Ofs when the degree of change is less than the predetermined degree, and, to decrease the compensation brightness level Ofs when the degree of change is greater than or equal to the predetermined degree. The brightness compensation circuit 112*a* is coupled to the accumulating circuit 110*a*, and configured to add a brightness level corresponding to the input display data DDin with the compensation brightness level Ofs to generate a compensated output display data DDout. Specifically, the accumulating circuit 110*a* is configured to update the compensation brightness level Ofs according to the detect signal DS and the counter signal CS. The brightness compensation circuit 112*a* is configured to extract the brightness level from the input display data DDin to sum the extracted brightness level with the compensation brightness level Ofs, thereby generating the output display data DDout.

More particularly, the accumulating circuit 110*a* may be configured to count up or down to update the compensation brightness level Ofs according to the degree of change. In some embodiments, when the detect signal DS has the value 1, meaning that the degree of change is less than the predetermined degree, the accumulating circuit 110*a* may increase the compensation brightness level Ofs. On the contrary, when the detect signal DS has the value 0, meaning that the degree of change is greater than or equal to the predetermined degree, the accumulating circuit 110*a* may decrease the compensation brightness level Ofs.

Further, in addition to the detect signal DS used for determining increasing or decreasing the compensation brightness level Ofs, the accumulating circuit 110*a* may further be configured update the compensation brightness level Ofs according to a frequency of the counter signal CS. Specifically, at each time the accumulating circuit 110*a* receiving a rising edge of the counter signal CS, the accumulating circuit 110*a* may be configured to increase or decrease the compensation brightness level Ofs according to the detect signal DS. In this way, the compensation brightness level Ofs may be adjusted at different frequencies. In some embodiments, the first frequency used for increasing the compensation brightness level Ofs could be lower than the second frequency used for decreasing the compensation brightness level Ofs.

In order to provide the counter signal CS at different frequencies, the counter circuit 111*a* is configured to receive an up-count clock signal oscillating at the first frequency fu and a down-count clock signal oscillating at the second frequency fd. When the detect signal DS is value 1, indicating that the degree of change is less than the predetermined degree, the counter circuit 111*a* may be configured to provide the up-count Clku oscillating at the first frequency fu as the counter signal CS. On the contrary, when the detect signal DS is value 0, indicating that the degree of change is greater than or equal to the predetermined degree, the counter circuit 111*a* may be configured to provide the down-count Clkd oscillating at the second frequency fd as the counter signal CS.

In some embodiments, the accumulating circuit 111*a* may be configured to update the compensation brightness level Ofs by equal or by different brightness offset. For example, the accumulating circuit 111*a* may be configured to adjust the compensation brightness level Ofs by adding or subtracting the same brightness offset each time the counter signal CS is triggered. In another example, the accumulating circuit 111*a* may be configured to receive a brightness ratio Ofsr, and adjust the compensation brightness level Ofs by multiplying or dividing the brightness ratio Ofsr. Specifically, the brightness ratio Ofsr may be greater than 1, so the accumulating circuit 110*a* may be configured to increase the compensation brightness level Ofs by multiplying the compensation brightness level Ofs by the brightness ratio Ofsr, or the accumulating circuit 110*a* may be configured to decrease the compensation brightness level Ofs by dividing the compensation brightness level Ofs by the brightness ratio Ofsr.

In some embodiments, the accumulating circuit 111*a* may be configured to adjust the compensation brightness level Ofs within a specific range. For example, the accumulating circuit 111*a* may be configured to receive a maximum compensation brightness level Ofsmax, and the accumulating circuit 111*a* may be configured increase the compensation brightness level Ofs until the compensation brightness level Ofs reaches the maximum compensation brightness level Ofsmax.

Figure 3B:
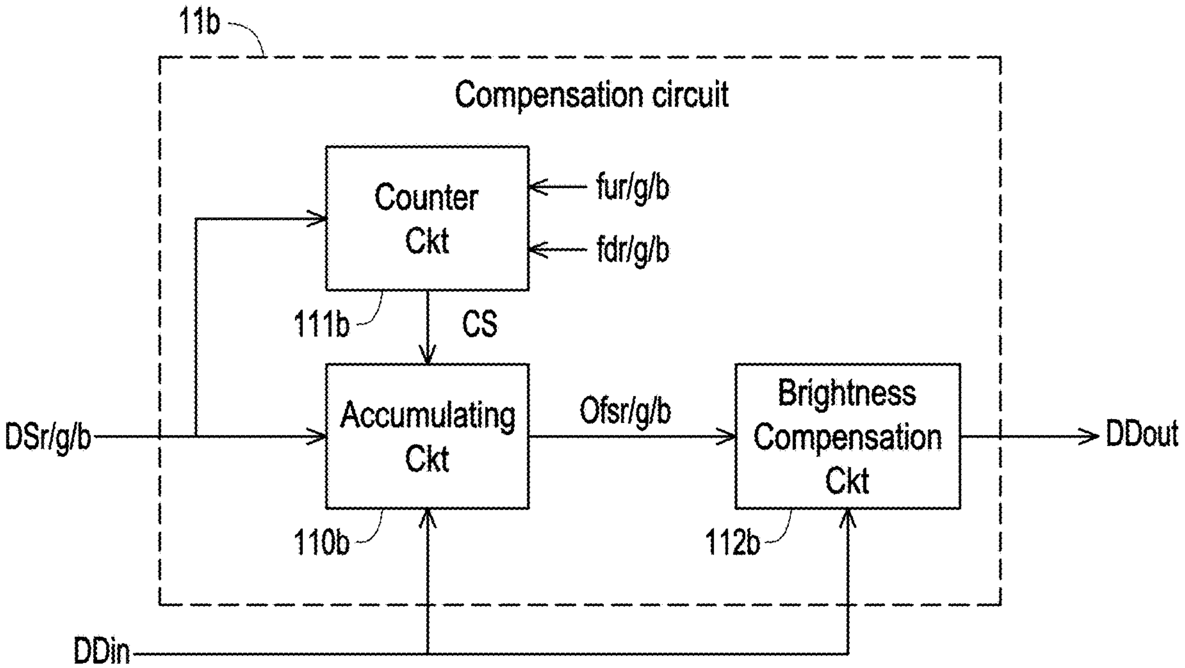
FIG. 3B illustrates a compensation circuit in accordance with some embodiments of the present disclosure.

FIG. 3B illustrates a compensation circuit 11*b* in accordance with some embodiments of the present disclosure. The compensation circuit 11*b* in FIG. 3B is similar to the compensation circuit 11*a* in FIG. 3A, so please refer to paragraphs above for detailed operations, which is omitted herein.

In this embodiment, the compensation circuit 11*b* is configured to receive the first to third detect signals DSr, DSg. DSb respectively corresponding to different colors of the input display data DDin. The compensation circuit 11*b* may be configured to generate a first to third compensation brightness levels Ofsr, Ofsg, Ofsb and updated at different frequencies.

Specifically, the counter circuit 111*b* may be coupled to the detecting circuit 10. The counter circuit 111*b* may be configured to provide a first to third counter signals CSr, CSg, CSb respectively according to the first to third detect signals DSr, DSg, DSb. The accumulating circuit 110*b* may be coupled to the detecting circuit 10 and the counter circuit 111*b*. The accumulating circuit 110*b* may be configured to adjust a first to third compensation brightness levels Ofsr, Ofsg, Ofsb respectively according to the first to third detect signals DSr. DSg, DSb. The brightness compensation circuit 112*b* may be coupled to the accumulating circuit 110*b* and configured to generate a compensated input display data DDin by summing a brightness level corresponding to the first color of the input display data DDin with the first compensation brightness level Ofsr, and adding a brightness level corresponding to the second color of the input display data DDin with the second compensation brightness level Ofsg, and adding a brightness level corresponding to the third color of the input display data DDin with the third compensation brightness level Ofsb.

In some embodiments, the compensation circuit 11*b* may adjust each of the first to third compensation brightness levels Ofsr, Ofsg, Ofsb independently, meaning that the first to third compensation brightness levels may be increased or decreased separately and at different frequencies. In this way, the counter circuit 111*b* is configured to receive a first to third up-count frequencies and a first to third down-count frequencies. The first up-count and down-count frequencies are used to adjust the first compensation brightness level Ofsr, the second up-count and down-count frequencies are used to adjust the second compensation brightness level Ofsg. and the third up-count and down-count frequencies are used to adjust the third compensation brightness level Ofsb. Specifically, the counter circuit 111*b* may be configured to provide the first counter signal CSg oscillating at a first up-count frequency fur or a first down-count frequency fdr according to the first detect signal DSr. The counter circuit 111*b* may be configured to provide the second counter signal CSg oscillating at a second up-count frequency fug or at a second down-count frequency fdg according to the second detect signal DSg. The counter circuit 111*b* may be configured to provide the third counter signal CSb oscillating at a third up-count frequency fub or at a third down-count frequency fdb according to the third detect signal DSb. The first up-count frequency fur, the second up-count frequency fug, and the third up-count frequency fvb are respectively lower than the first down-count frequency fdr, the second down-count frequency fdg, and the third down-count frequency fdb.

In some embodiments, the accumulating circuit 110*b* may be configured to increase the first compensation brightness level Ofsr at the first up-count frequency fur or decrease the first compensation brightness level Ofsr at the first down-count frequency fdr. The accumulating circuit 110*b* may be configured to increase the second compensation brightness level Ofsg at the second up-count frequency fug or decrease the second compensation brightness level Ofsg at the second down-count frequency fdg. The accumulating circuit 110*b* is configured to increase the third compensation brightness level Ofsb at the third up-count frequency fub or decrease the third compensation brightness level Ofsb at the third down-count frequency fdb.

Figure 4:
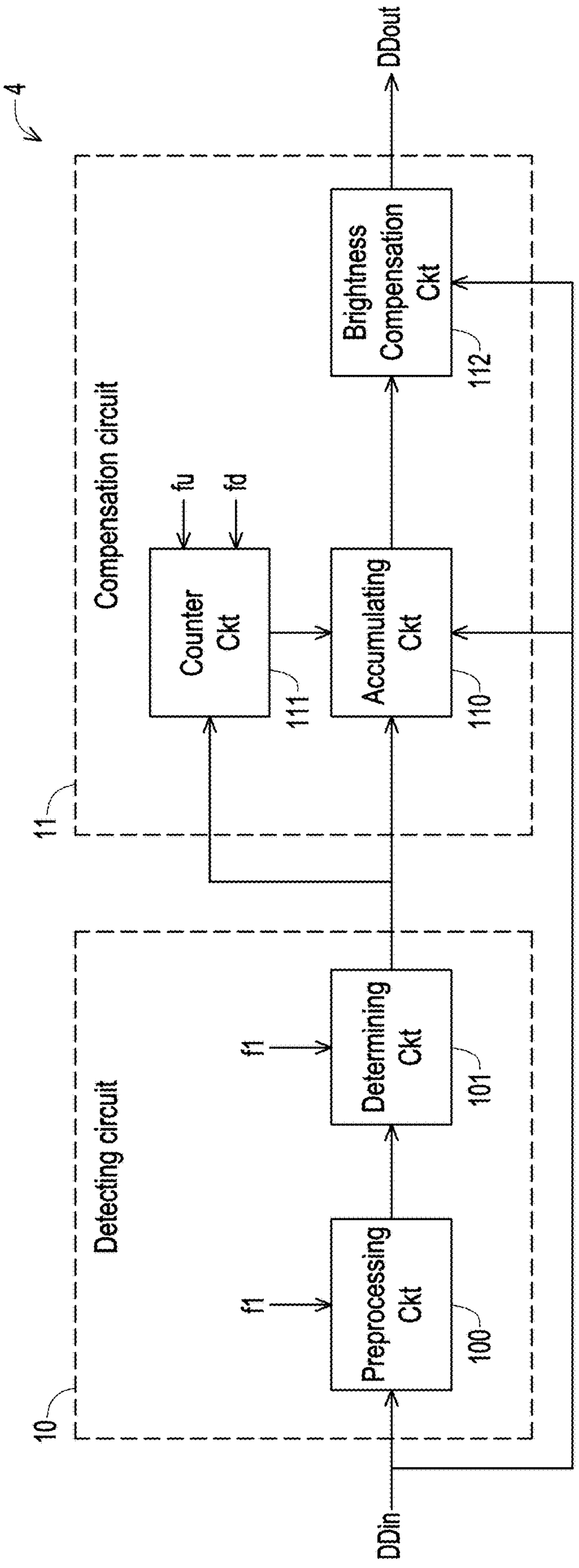
FIG. 4 illustrates a display processing circuit in accordance with some embodiments of the present disclosure.

FIG. 4 illustrates a display processing circuit 4 in accordance with some embodiments of the present disclosure. The display processing circuit 4 in FIG. 4 is similar to the display processing circuit 1 in FIG. 1, and thus the same or similar circuit blocks are labeled by the same reference symbols.

In this embodiment, operating frequencies of certain circuit blocks are illustrated. Specifically, the preprocessing circuit 100 and the determining circuit 101 are operated according to a clock signal having a detecting frequency f1. Meanwhile, the counter circuit 111 in the compensation circuit 11 are providing the counter signal oscillating at the up-count frequency fc or at the down-count frequency fd to the accumulating circuit 110.

Specifically, the preprocessing circuit 100 and the determining circuit 101 may be operated under the detecting frequency f1, so that the detecting circuit 10 may be configured to generate the detect signal DS at the detecting frequency f1. Further, the compensation circuit 11 receiving the detecting signal may be configured to adjust the compensation brightness level Ofs at the up-count frequency fu or at the down-count frequency fd. In this way, the display processing circuit 4 may compensate or cancel the display brightness with a better image display quality. For example, since the brightness degradation may occur after the degradation condition is applied for a long period of time but quickly recover to its desired brightness level once the degradation condition is gone, so that the up-count frequency fu may be selected from a lower frequency than the down-count frequency fd, meaning that the compensation brightness level Ofs may be increased at a relatively lower speed but released at a faster speed.

Figure 5A:
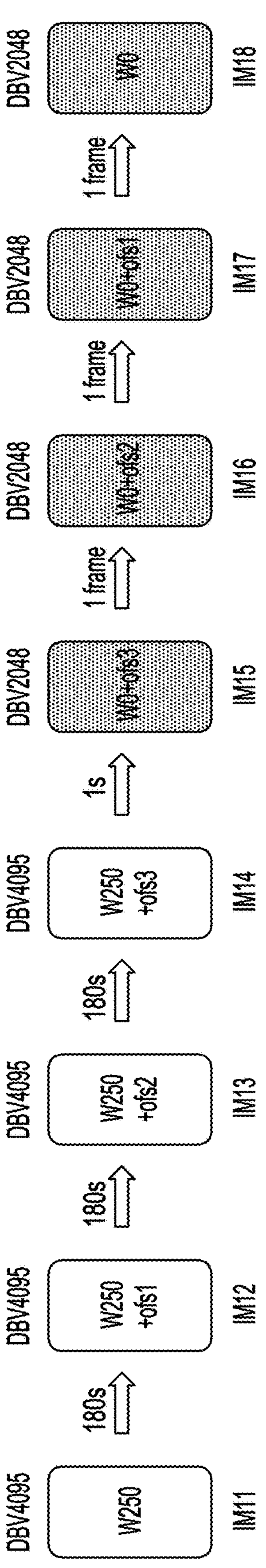
FIG. 5A illustrates a plurality of images showing a process of how a display image of an EL display device changes in accordance with to some embodiments of the present disclosure.

FIG. 5A illustrates a plurality of images IM11-IM18 showing a process of how a display image of an EL display device changes according to some embodiments of the present disclosure.

Specifically, the EL display device showing display images in FIG. 5A may include the display processing circuit 1 in FIG. 1 so that the compensation brightness level may be applied to the display image when the degradation condition is met. In this embodiment, the degradation condition includes three sub-conditions: the characteristic values between two display input data are the same or the difference is within a predetermined range, the brightness setting values between two display input data are the same or the difference is within a predetermined range, and the average brightness level of the display input data is greater than or equal to the brightness threshold. In this way, as long as one of the three sub-conditions of the degradation condition in the above is met, the detecting circuit 10 may be configured to set the detect signal as the value 1, instructing the compensation circuit 11 to start up-counting and increase the compensation brightness level. On the other hand, only all three sub-conditions of the degradation condition are not met, the detecting circuit 10 may be configured to set the detect signal as the value 0, instructing the compensation circuit 11 to start down-counting to decrease the compensation brightness level.

As can be seen in FIG. 5A, at the time when the EL display device is displaying the image IM11, a dbv parameter of the EL display device is set to 4095 corresponding to a maximum display brightness. After the dbv parameter is kept at continuously 4095 for 180 seconds, which is one cycle time of the up-count frequency fu, the display processing circuit 1 may be configured to from the compensation brightness level from 0 to a first compensation brightness level ofs1. For example, a brightness level W250 corresponding to the input display data DDin and shown as the image IM1 may be compensated as the brightness level W250+ofs1 corresponding to the output display data DDout and shown as the image IM2.

As the dbv parameter is kept at 4095, the display processing circuit 1 may be configured to keep increasing the compensation brightness level every 180 seconds, so that the compensated brightness level of the image IM13 becomes as W250+ofs2, and continued as W250+ofs3 in the image IM14.

After one second, the dbv parameter is turned down to 2048 in the image IM15, making the dbv parameter less than a dbv threshold and the degradation condition no longer met. In this way, after one frame time corresponding to a cycle time of the down-count frequency, the display processing circuit 1 may be configured to turn the compensation brightness level down, so that the compensated brightness level becomes as W0+ofs2 in the image IM16. Thereafter, the compensated brightness level continues to dop to W0+ofs1 and W0 respectively in the images IM17 and IM18. Specifically, this series of images demonstrate how the display processing circuit 1 is configured to compensate the brightness level of the input display data DDin according to the detecting frequency f1, the up-count frequency fu, and the down-count frequency fd.

In some embodiment, the display processing 1 may cancel the compensation brightness level to 0 when the brightness level corresponding to the input display data DDin is W0. In this embodiment, the brightness level W0 may be a lowest brightness level for displaying a black color. Since there is no need to turn up the brightness of the block, the brightness compensation circuit 112 of the display processing circuit 1 may cancel the compensation brightness level and directly output the brightness level W0 as the output display data DDout accordingly.

Figure 5B:
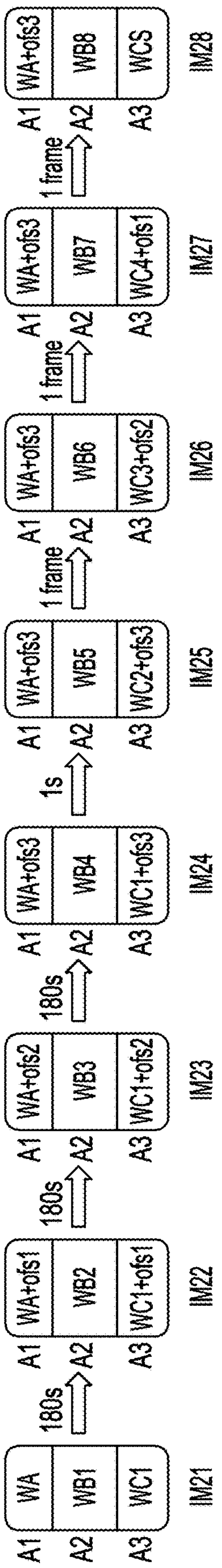
FIG. 5B illustrates a plurality of images showing a process of how a display image of an EL display device changes according to some embodiments of the present disclosure.

FIG. 5B illustrates a plurality of images IM21-IM28 showing a process of how a display image of an EL display device changes according to some embodiments of the present disclosure.

Specifically, the EL display device showing display images in FIG. 5B may include the display processing circuit 1 in FIG. 1 so that the compensation brightness level may be applied to the display image when the degradation condition is met. In this embodiment, the degradation condition includes three sub-conditions: the characteristic values between two display input data are the same or the difference is within a predetermined range, the brightness setting values between two display input data are the same or the difference is within a predetermined range, and the average brightness level of the display input data is greater than or equal to the brightness threshold. In this way, as long as one of the three sub-conditions of the degradation condition in the above is met, the detecting circuit 10 may be configured to set the detect signal as the value 1, instructing the compensation circuit 11 to start up-counting and increase the compensation brightness level. On the other hand, only all three sub-conditions of the degradation condition are not met, the detecting circuit 10 may be configured to set the detect signal as the value 0, instructing the compensation circuit 11 to start down-counting to decrease the compensation brightness level.

In this embodiment, the display image of the EL display device may be divided into three areas A1-A3. For example, the EL display device may be used for display video, and the area A1 is used to show icon of the video, the area A2 is used to show the video contents, and the area A3 is used to show video information, such as video title, subtitles, etc. In this way, contents in the area A2 may be dynamic and constantly changing while contents in the areas A1, A3 may be stationary and updated in a relatively low frequency. The display processing circuit 1 may be configured to compensate brightness level for each display area individually.

As can be seen in the images IM21-IM24, the areas A1, A3 are stationary for display brightness level WA and WC1 respectively, so that the display processing circuit 1 may be configured to increase the compensation brightness level every 180 seconds. In the meantime, the area A2 is display constantly changing images, so that no compensation is applied to the area A2.

After one second of displaying the image IM24, the area A3 is changed from displaying a brightness level WC2 to another brightness level WC3 in the displayed image IM25, rendering the contents in the area A3 no longer stationary and the display processing circuit 1 to start release or decrease the compensation brightness level applied to the area A3.

After one frame time of displaying the image IM25, the display processing circuit 1 lowers the compensation brightness level applied to the area A3 in the image IM26 from ofs3 to ofs2. In addition, the compensation brightness level applied to the area A3 keeps decreasing in the images IM27. IM28 since the brightness level displayed in the area A3 in the images IM27, IM28 keeps changing.

In the images IM26-IM28, while the compensation brightness levels applied to the area A3 are decreased, the compensation brightness level applied to the area A1 is kept the same at ofs3. Specifically, since the up-count frequency fu is lower than the down-count frequency fd, the compensation brightness level applied to the area A1 is increased every 180 seconds, and is kept at ofs3 in the images IM24-IM28.

Figure 6:
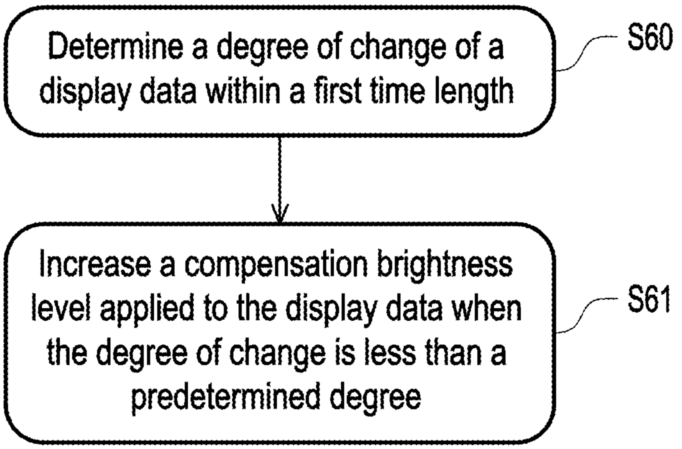
FIG. 6 illustrates a flowchart of a compensation method in accordance with some embodiments of the present disclosure.

FIG. 6 illustrates a flowchart of a compensation method in accordance with some embodiments of the present disclosure. The compensation method may be applied to an image processing device in an EL display device to compensate a brightness level displayed by the EL display device. The compensation method may be applied to the image processing device 1 in FIG. 1.

The compensation method includes steps S60 and S61. In step S60, the detecting circuit 10 may be configured to determine a degree of change of a display data within a first time length. In step S61, the compensation circuit 11 may be configured to increase a compensation brightness level applied to the display data when the degree of change is less than a predetermined degree. Please refer to paragraphs above for greater details of the display processing circuit 10, which is omitted herein.

Figure 7A:
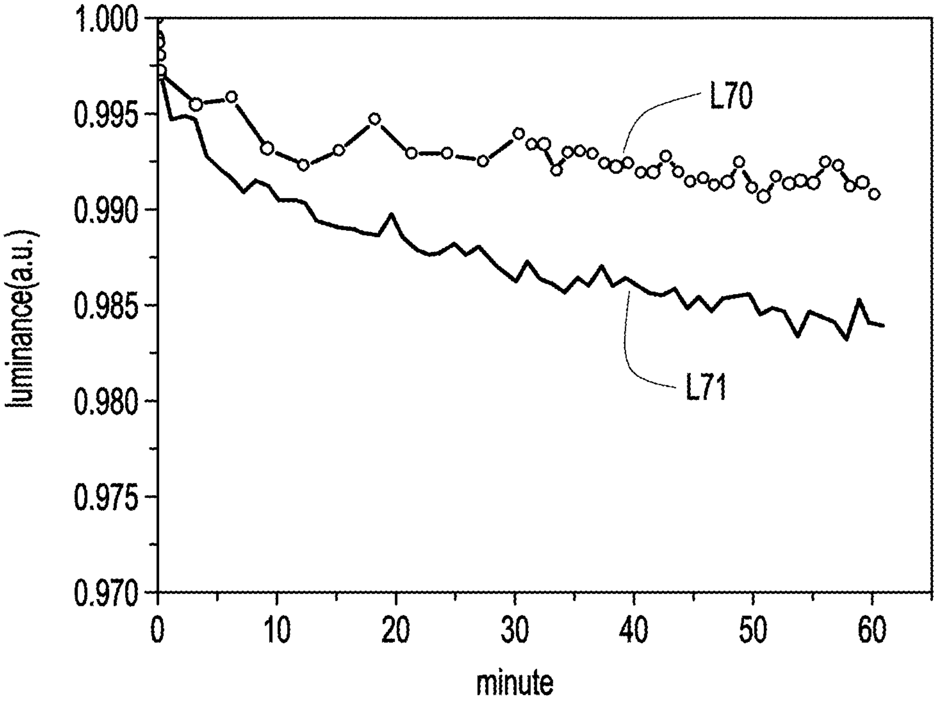
FIGS. 7A-7C illustrate comparison luminance of EL display devices in accordance with some embodiments of the present disclosure.
Figure 7B:
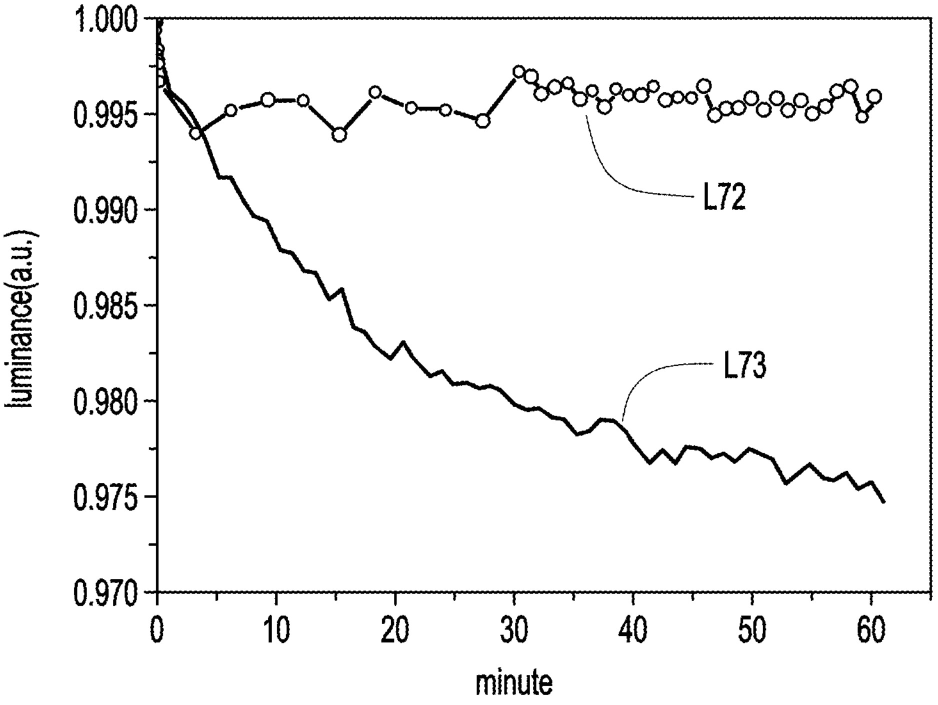
Figure 7C:
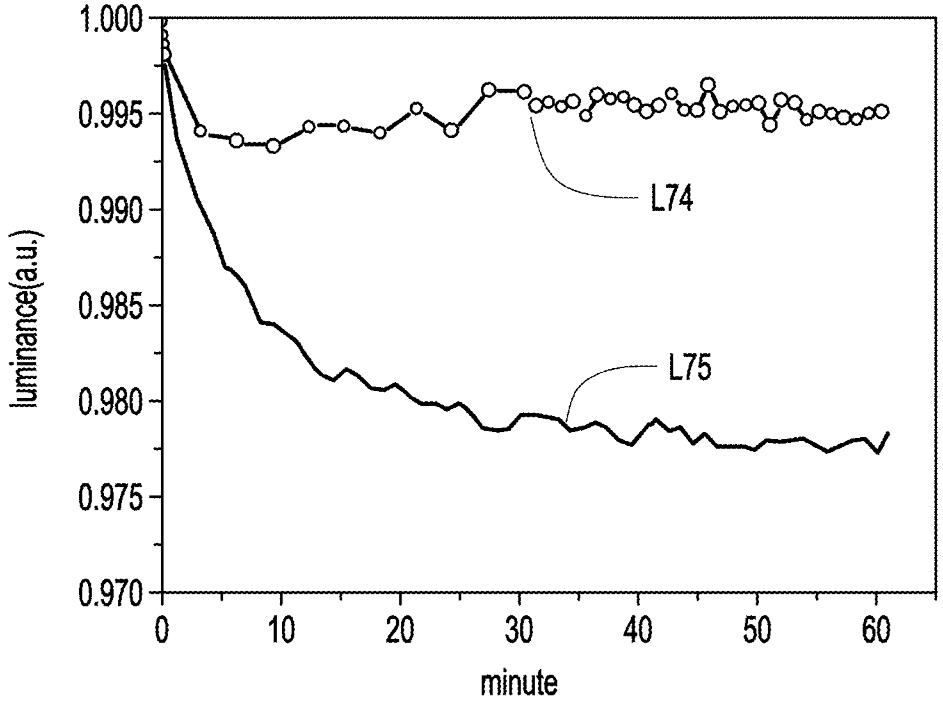

FIGS. 7A-7C illustrate comparison luminance of EL display devices in accordance with some embodiments of the present disclosure. Specifically, FIGS. 7A-7C respectively illustrate measured luminance of the EL display device displaying initial luminance of 247 nits, 454 nits, and 901 nits. Each of the FIGS. 7A-7C illustrate two measurement curves with one curve showing the luminance displayed by the EL device with the display processing circuit 1 in FIG. 1 and another curve without the brightness level compensated.

In FIG. 7A, two curves L70 and L71 are illustrated, with the curve L70 corresponds to the measured luminance displayed by the EL display device with the display processing circuit 1 disposed inside (i.e., with the displayed brightness level compensated), and the curve L71 corresponds to the measured luminance displayed by the EL display device without the brightness level compensated. As can be seen in the two curves L70 and L71, the two EL display devices are controlled to display the same brightness and hold the brightness for a certain period of time. However, as the processing time increases, degradations have occurred on both the two EL display devices, while the curve L70 has a relatively small brightness degradation level compared to the curve L71, demonstrating that the display processing circuit 1 may effectively compensate the brightness degradation.

Similarly, in FIGS. 7B and 7C, the curves L72 and L74 show brightness curves displayed by the EL display devices with the display processing circuit 1 disposed inside, and the curves L73 and L75 show brightness curves displayed by the EL display device without the display processing circuit 1. The curves L72 and L74 also show that the EL display devices have smaller brightness degradation levels when displaying higher luminance.

In some embodiments, the display processing circuit 1 may effectively control the brightness degradation level in a smaller range, such as between 1 a.u. (arbitrary unit) to 0.99 a.u., effectively improving display quality of the EL display device providing better user experience.

In summary, the image processing device and the compensation method may be used in different scenario which cause display to compensate temporary brightness degradation to keep a brightness level displayed by the EL display device within a predetermined brightness range. Further, for user's comfort, the display processing circuit is configured to increase the compensation brightness level at a frequency lower than that to decrease the compensation brightness level. In this way, the image processing device and the compensation method may effectively keep luminance of the EL display device approximately the same, avoiding the brightness degradation to be observed, thereby improving display quality and user satisfaction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display processing circuit adapted to compensate an electroluminescence (EL) display device, the display compensation circuit comprising:

a detecting circuit configured to determine a degree of change of a display data within a first time length; and a compensation circuit configured to increase a compensation brightness level applied to the display data when the degree of change is less than a predetermined degree.

2. The display processing circuit of claim 1, wherein the compensation circuit is configured to decrease the compensation brightness level applied to the display data when the degree of change is greater than or equal to the predetermined degree.

3. The display processing circuit of claim 2, wherein the compensation circuit is configured to increase the compensation brightness level until a maximum compensation brightness level is reached.

4. The display processing circuit of claim 1, wherein the detecting circuit is configured to receive and compare a first display data and a second display data respectively received at a first time point and a second time point, the first time point and the second time point are separated by the first time length, wherein the detecting circuit is configured to determine the degree of change less than the predetermined degree when the first display data and the second display data are the same, and wherein the detecting circuit is configured to determine the degree of change greater than or equal to the predetermined degree when the first display data and the second display data are not the same.

5. The display processing circuit of claim 4, wherein the detecting circuit comprises:

a preprocessing circuit configured to extract a first and second characteristic values respectively from the first and second display data; and a determining circuit configured to compare the first and second characteristic values to generate the degree of change.

6. The display processing circuit of claim 5, wherein the preprocessing circuit is configured to perform a cyclic redundancy check (CRC) on the first and second display data to generate the first and second characteristic values.

7. The display processing circuit of claim 1, wherein the detecting circuit is configured to receive and compare a first display data and a second display data separated by the first time length, the detecting circuit is configured to determine the degree of change between the first display data and the second display data by comparing a first brightness setting value and a second brightness setting value respectively corresponding to the first display data and the second display data to generate the degree of change.

8. The display processing circuit of claim 7, wherein the first and second brightness setting values are a first dbv value and second dbv value, the detecting circuit comprises:

a determining circuit configured to receive and compare the first dbv value and the second dbv value to generate the degree of change.

9. The display processing circuit of claim 1, wherein the compensation circuit comprises:

an accumulating circuit, coupled to the detecting circuit and configured to increase the compensation brightness level when the degree of change is less than the predetermined degree; and a brightness compensation circuit coupled to the accumulating circuit and configured to add a brightness level corresponding to the display data with the compensation brightness level to generate a compensated display data.

10. The display processing circuit of claim 9, wherein the compensation circuit comprises:

a counter circuit coupled to the detecting circuit and the accumulating circuit, the counter circuit being configured to provide a counter signal to the accumulating circuit according to the degree of change, wherein the accumulating circuit is configured to adjust the compensation brightness level according to a frequency of the counter signal.

11. The display processing circuit of claim 10, wherein the counter circuit is configured to provide the counter signal oscillating at a first frequency when the degree of change is less than the predetermined degree, and configured to provide the counter signal oscillating at a second frequency faster than the first frequency when the degree of change is greater than or equal to the predetermined degree.

12. The display processing circuit of claim 9, wherein the accumulating circuit is configured to increase the compensation brightness level by multiplying the compensation brightness level by a brightness ratio, or the accumulating circuit is configured to increase the compensation brightness level by adding the compensation brightness level by a brightness offset.

13. The display processing circuit of claim 1, wherein the detecting circuit is configured to compare an average brightness level corresponding to the display data with a brightness threshold to generate a detect signal to the compensation circuit accordingly.

14. The display processing circuit of claim 13, wherein the detecting circuit comprises:

a preprocessing circuit, configured to calculate a first average brightness level, a second average brightness level, and a third average brightness level by averaging brightness levels respectively of a first to third colors of all pixels corresponding to the display data; and a determining circuit configured to compare the first to third average brightness levels respectively with a first to third brightness thresholds to generate a first to third detect signals.

15. The display processing circuit of claim 14, wherein the compensation circuit comprises:

a counter circuit coupled to the detecting circuit, the counter circuit being configured to provide a first to third counter signals respectively according to the first to third detect signals;

an accumulating circuit coupled to the detecting circuit and the counter circuit, the accumulating circuit being configured to adjust a first compensation brightness level, a second compensation brightness level, and a third compensation brightness level respectively according to the first to third detect signals and the first to third counter signals; and a brightness compensation circuit coupled to the accumulating circuit and configured to generate a compensated display data by adding a first brightness level corresponding to the first color of the display data with the first compensation brightness level, and adding a second brightness level corresponding to the second color of the display data with the second compensation brightness level, and adding a third brightness level corresponding to the third color of the display data with the third compensation brightness level.

16. The display processing circuit of claim 15, wherein the counter circuit is configured to provide the first counter signal oscillating at a first up-count frequency or a first down-count frequency according to the first detect signal, the counter circuit is configured to provide the second counter signal oscillating at a second up-count frequency or at a second down-count frequency according to the second detect signal, the counter circuit is configured to provide the third counter signal oscillating at a third up-count frequency or at a third down-count frequency according to the third detect signal, wherein the first up-count frequency, the second up-count frequency, and the third up-count frequency are respectively lower than the first down-count frequency, the second down-count frequency, and the third down-count frequency.

17. The display processing circuit of claim 16, wherein the accumulating circuit is configured to increase the first compensation brightness level at the first up-count frequency or decrease the first compensation brightness level at the first down-count frequency, the accumulating circuit is configured to increase the second compensation brightness level at the second up-count frequency or decrease the second compensation brightness level at the second down-count frequency, the accumulating circuit is configured to increase the third compensation brightness level at the third up-count frequency or decrease the third compensation brightness level at the third down-count frequency.

18. The display processing circuit of claim 1, wherein the detecting circuit is further configured to generate a first degree of change and a second degree of change respectively corresponding to a first display area and a second display area on the EL display device according to the display data, and the compensation circuit is further configured to adjust a first area compensation brightness level and a second area compensation brightness level respectively according to the first degree of change and the second degree of change.

19. A compensation method for compensating an electroluminescence (EL) display device, the compensation method comprising:

determining a degree of change of a display data within a first time length; and increasing a compensation brightness level applied to the display data when the degree of change is less than a predetermined degree.

20. The compensation method of claim 19, comprising:

decreasing the compensation brightness level applied to the display data when the degree of change is greater than or equal to the predetermined degree.

21. The compensation method of claim 20, comprising:

receiving and comparing a first display data and a second display data separated by the first time length;

determining the degree of change between the first display data and the second display data by comparing a first brightness setting value and a second brightness setting value respectively corresponding to the first display data and the second display data to generate the degree of change.

22. The compensation method of claim 21, wherein the first and second brightness setting values are a first dbv value and a second dbv value, the compensation method comprises:

receiving and comparing the first dbv value and the second dbv value to generate the degree of change.

23. The compensation method of claim 20, wherein the compensation brightness level is increased until a maximum compensation brightness level is reached.

24. The compensation method of claim 19, comprising:

receiving and comparing a first display data and a second display data respectively at a first time point and a second time point, the first time point and the second time point being separated by the first time length;

determining the degree of change less than the predetermined degree when the first display data and the second display data are the same; and determining the degree of change less greater than or equal to the predetermined degree when the first display data and the second display data are not the same.

25. The compensation method of claim 24, comprising:

extracting a first and second characteristic values respectively from the first and second display data; and comparing the first and second characteristic values to generate the degree of change.

26. The compensation method of claim 25, comprising:

performing a cyclic redundancy check (CRC) on the first and second display data to generate the first and second characteristic values.

27. The compensation method of claim 19, comprising:

adding a brightness level corresponding to the display data with the compensation brightness level to generate a compensated display data.

28. The compensation method of claim 27, further comprising:

providing a counter signal according to the degree of change, wherein the compensation brightness level is adjusted according to a frequency of the counter signal.

29. The compensation method of claim 28, wherein the counter signal oscillating at a first frequency is provided when the degree of change is less than the predetermined degree, and the counter signal oscillating at a second frequency faster than the first frequency is provided when the degree of change is greater than or equal to the predetermined degree.

30. The compensation method of claim 29, wherein the compensation brightness level is increased by multiplying the compensation brightness level by a brightness ratio, or the compensation brightness level is increased by adding the compensation brightness level by a brightness offset.

31. The compensation method of claim 19, comprising:

comparing an average brightness level corresponding to the display data with a brightness threshold to generate a detect signal accordingly.

32. The compensation method of claim 31, comprising:

calculating a first average brightness level, a second average brightness level, and a third average brightness level by averaging brightness levels respectively of a first to third colors of all pixels corresponding to the display data; and comparing the first to third average brightness levels respectively with a first to third brightness thresholds to generate a first to third detect signals.

33. The compensation method of claim 32, comprising:

providing a first to third counter signals respectively according to the first to third detect signals;

adjusting a first compensation brightness level, a second compensation brightness level, and a third compensation brightness level respectively according to the first to third detect signals and the first to third counter signals; and generating a compensated display data by adding a first brightness level corresponding to the first color of the display data with the first compensation brightness level, and adding a second brightness level corresponding to the second color of the display data with the second compensation brightness level, and adding a third brightness level corresponding to the third color of the display data with the third compensation brightness level.

34. The compensation method of claim 33, comprising:

providing the first counter signal oscillating at a first up-count frequency or a first down-count frequency according to the first detect signal;

providing the second counter signal oscillating at a second up-count frequency or at a second down-count frequency according to the second detect signal; and providing the third counter signal oscillating at a third up-count frequency or at a third down-count frequency according to the third detect signal, wherein the first up-count frequency, the second up-count frequency, and the third up-count frequency are respectively lower than the first down-count frequency, the second down-count frequency, and the third down-count frequency.

35. The compensation method of claim 34, comprising:

increasing the first compensation brightness level at the first up-count frequency or decreasing the first compensation brightness level at the first down-count frequency;

increasing the second compensation brightness level at the second up-count frequency or decreasing the second compensation brightness level at the second down-count frequency; and increasing the third compensation brightness level at the third up-count frequency or decreasing the third compensation brightness level at the third down-count frequency.

36. The compensation method of claim 19, comprising:

generating a first degree of change and a second degree of change respectively corresponding to a first display area and a second display area on the EL display device according to the display data; and adjusting a first area compensation brightness level and a second area compensation brightness level respectively according to the first degree of change and the second degree of change.

37. A display processing circuit adapted to compensate an electroluminescence (EL) display device, the display processing circuit comprising:

a detecting circuit configured to compare an average brightness level corresponding to a display data with a brightness threshold to generate a detect signal accordingly; and a compensation circuit configured to adjust a compensation brightness level applied to the display data when the average brightness level is greater than the brightness threshold.

38. The display processing circuit of claim 37, wherein the detecting circuit comprises:

a preprocessing circuit, configured to calculate a first average brightness level, a second average brightness level, and a third average brightness level by averaging brightness levels respectively of a first to third colors of all pixels corresponding to the display data; and a determining circuit configured to compare the first to third average brightness levels respectively with a first to third brightness thresholds to generate a first to third detect signals.

39. The display processing circuit of claim 38, wherein the compensation circuit comprises:

a counter circuit coupled to the detecting circuit, the counter circuit being configured to provide a first to third counter signals respectively according to the first to third detect signals;

an accumulating circuit coupled to the detecting circuit and the counter circuit, the accumulating circuit being configured to adjust a first compensation brightness level, a second compensation brightness level, and a third compensation brightness level respectively according to the first to third detect signals and the first to third counter signals; and a brightness compensation circuit coupled to the accumulating circuit and configured to generate a compensated display data by adding a first brightness level corresponding to the first color of the display data with the first compensation brightness level, and adding a second brightness level corresponding to the second color of the display data with the second compensation brightness level, and adding a third brightness level corresponding to the third color of the display data with the third compensation brightness level.

40. The display processing circuit of claim 39, wherein the counter circuit is configured to provide the first counter signal oscillating at a first up-count frequency or a first down-count frequency, the counter circuit is configured to provide the second counter signal oscillating at a second up-count frequency or a second down-count frequency, the counter circuit is configured to provide the third counter signal oscillating at a third up-count frequency or a third down-count frequency, wherein the first up-count frequency, the second up-count frequency, and the third up-count frequency are respectively lower than the first down-count frequency, the second down-count frequency, and the third down-count frequency.

41. The display processing circuit of claim 40, wherein the accumulating circuit is configured to increase the first compensation brightness level at the first up-count frequency or decrease the first compensation brightness level at the first down-count frequency, the accumulating circuit is configured to increase the second compensation brightness level at the second up-count frequency or decrease the second compensation brightness level at the second down-count frequency, the accumulating circuit is configured to increase the third compensation brightness level at the third up-count frequency or decrease the third compensation brightness level at the third down-count frequency.

* * * * *